Figure 1:
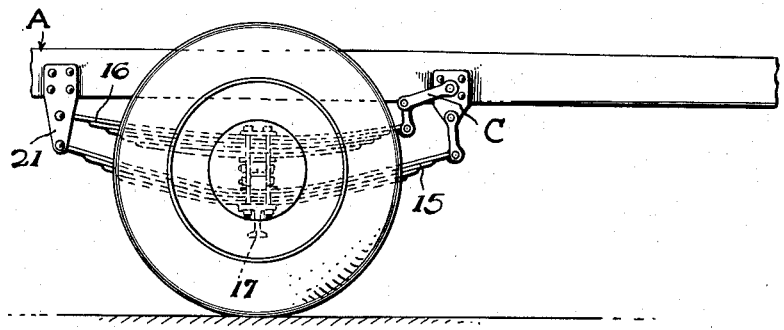

July 26, 1955  N. S. FOCHT  2,714,003

SPRING SUSPENSIONS FOR VEHICLES

Filed Sept. 19, 1951

INVENTOR

Nevin S. Focht.

ATTORNEY ial spring 15 is constantly effective to yieldably support the running gear or chassis A and rests on the axle 17 to which it is connected by suitable clips 18, the said clips in turn having means for receiving the shackle plates 19 connecting with the spring clip 20 of the auxiliary spring 16.

The main spring 15 has one end connected to the support 21 by a fixed pin 15a while its other end is connected to the link suspension means 22. The stiff spring 16 is anchored as at 16a to the member 21 while its opposite end 16b is relatively free and adapted to cooperate with a shock absorber C of Figure 1 or sway control means C' of Figure 2.

The spring 16 is connected to the chassis A so that it cannot move longitudinally relative thereto. Moreover, since the shackle plates 19 are connected to the clips 18 and 20 by pins which, as shown, extend longitudinally relative to the vehicle, it is apparent that the spring 16 cannot move longitudinally relative to the axle 17. Said spring 16, therefore, acts as a radius rod to hold the axle 17 against substantially any movement other than vertical movement, relative to the chassis and thus relieves the spring 15 of certain loads which might otherwise be imposed thereon. However, it is further apparent that the shackle connection between the axle 17 and the spring 16 is such as to permit free vertical tilting movements of the axle 17 relative to the chassis A in a plane including the longitudinal axis of the axle. Therefore, such tilting movements of the axle do not impose torque upon the spring 16.

Figure 2:
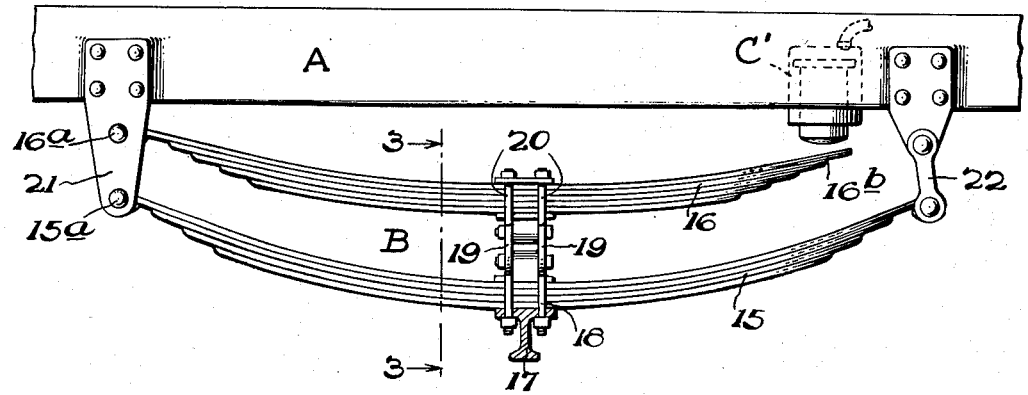
Figure 3:
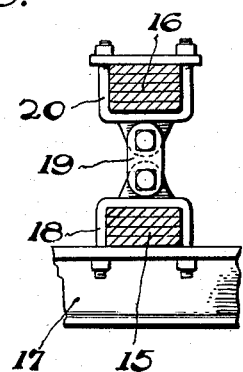

Figures 1 and 2 of the drawings illustrate the manner in which the stiff spring 16 cooperates with the related body stabilizing control device C or C'. When the chassis A is only lightly loaded only the main spring 15 is effective to support the loaded running gear but upon predetermined loading of the running gear the auxiliary spring 16 is rendered effective to assist said main spring in supporting the loaded running gear or chassis, and to also operate means for reducing shock and side sway on the body.

Figure 4:
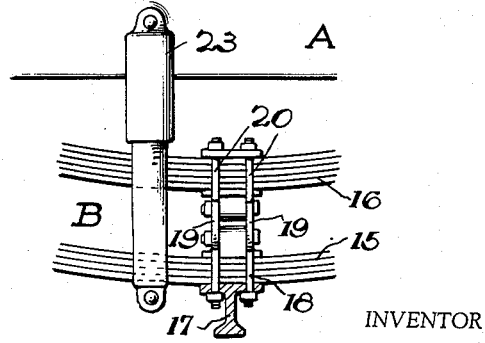
Figure 4:

As illustrated in Figure 4, it may be desirable to have a directly connected shock absorber between the axle and chassis. This shock absorber 23 in Figure 4 provides a special control characteristic to act on low frequency roll or pitch so as to add stability to the soft main spring under light vehicle loads when the auxiliary spring is not acting.

From the foregoing, it will be seen that the shackle arrangement 19 connecting the springs 15 and 16 provides an effective radius rod to prevent braking or driving torque overstressing the lower main spring which might otherwise cause it to fail.

I claim:

1. In a vehicle including a chassis and an axle, a leaf spring connected at its ends to said chassis and rigidly connected intermediate its ends to said axle, an auxiliary leaf spring overlying and spaced above said first mentioned leaf spring, a connection between one end of said auxiliary leaf spring and said chassis at a point fixed with respect to said chassis, a connection between said axle and said auxiliary leaf spring, and means rendering said auxiliary leaf spring ineffective to resist loads of predetermined weight and effective to resist loads in excess of said predetermined weight imposed on said chassis, the connection between said auxiliary leaf spring and said axle being rigid longitudinally with respect to the vehicle so that said auxiliary leaf spring acts as a radius rod to limit longitudinal movement of said axle relative to said chassis, the connection between said auxiliary leaf spring and said axle additionally being flexible transversely with respect to the vehicle so that the axle may tilt vertically relative to the chassis in a plane including the longitudinal axis of the axle without imposing torque upon said auxiliary leaf spring.

2. The structure as set forth in claim 1 including shackle plates between the axle and the auxiliary spring pivoted relative to the axle and said auxiliary spring on axes extending longitudinally relative to the vehicle to provide rigidity longitudinally relative to the vehicle and flexibility transversely relative to the vehicle of the connection between the axle and the auxiliary spring.

References Cited in the file of this patent

UNITED STATES PATENTS

| | | |
|---|---|---|
| 1,377,913 | Neff | May 10, 1921 |
| 1,881,408 | Le Moon | Oct. 4, 1932 |
| 1,959,118 | Uffelman | May 15, 1934 |
| 2,550,074 | Marshall | Apr. 24, 1951 |

FOREIGN PATENTS

| | | |
|---|---|---|
| 424,986 | Great Britain | Mar. 5, 1935 |